June 30, 1936.  G. GREISSINGER  2,046,069
KNEE JOINT FOR ARTIFICIAL LEGS
Filed Feb. 16, 1934

Patented June 30, 1936

2,046,069

UNITED STATES PATENT OFFICE 2,046,069

KNEE JOINT FOR ARTIFICIAL LEGS

Georg Greissinger, Vaihingen, Germany

Application February 16, 1934, Serial No. 711,581
In Germany January 2, 1932

1 Claim. (Cl. 3—2)

A knee joint for artificial legs is known, in which the ends of the thigh and shank are an imitation of the natural knee joint. The ends of the thigh and shank of such a knee joint are held together by four connecting levers, seven pins and an adjustable clamping bolt in the shank. This knee joint makes the artificial leg extremely heavy and produces a great deal of friction which is very objectionable to the wearer. Moreover, such a knee joint, owing to the many connecting levers and hinge pins soon works loose so that it loses its hold and reliability and consequently requires repairing after a short time.

These objections are overcome by the knee joint for the artificial leg according to the invention, which is characterized in that a single pair of connecting links extend upwards, inclined towards the rear, from a pin mounted in the shank to a pin mounted in the thigh. The pin in the thigh serves at the same time as axle for a clamping bolt. By this construction of knee joint the contact surfaces of the limb ends are subjected to very little friction and wear and moreover the knee joint is simple and light.

Further, the pins for the links are according to the invention only slightly stressed because the load acts directly on rolling contact surfaces. When the knee is in extended position, the supporting point is situated on the front side and in the case of slight movement (comfortable position) the supporting point is situated slightly out of the centre towards the rear. The supporting point travels from the rear towards the front during the rolling of the joint surfaces from the bent position and from the front towards the rear during the movement from the extended position into the bent position.

An embodiment of the invention is illustrated by way of example in the accompanying drawing in which:—

Figure 1:
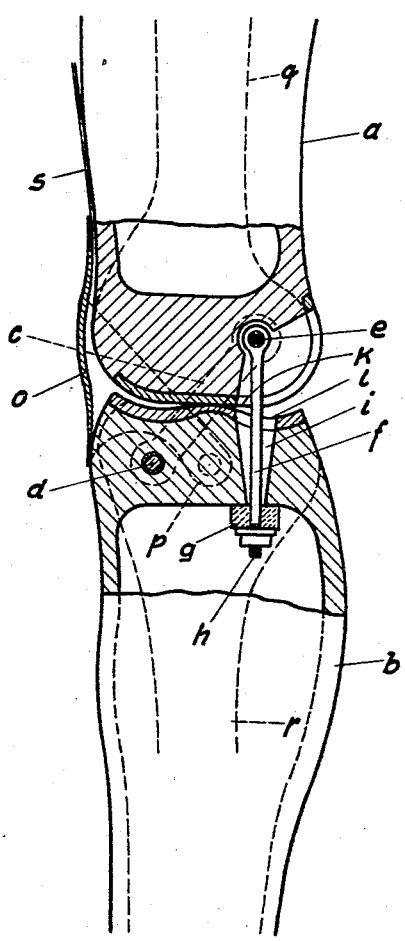
Fig. 1 shows the knee joint for artificial legs in longitudinal section in side view in the position shortly before the extended position.
Figure 2:
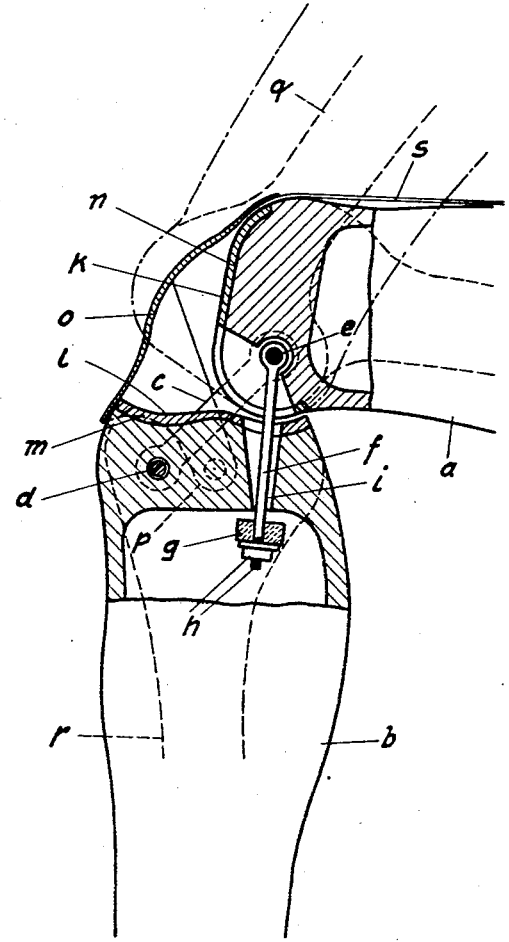
Fig. 2 is a similar view showing the joint in bent position.
Figure 3:
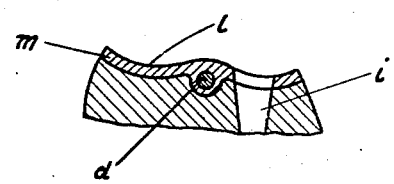
Fig. 3 shows a detail.

The hollow thigh casing $a$ is constructed at its lower end like a natural thigh and has a slightly convex lower contact surface $k$. This contact surface $k$ terminates at its rear end in a rounded portion in the shape of an arc of a circle having its centre near the rear side of the hollow thigh casing. In the hollow thigh casing $a$ a sector shaped recess embracing an angle of more than 90° extends from said rounded portion of the contact surface to the centre of the arc along which the contact surface $k$ is curved. The hollow shank casing $b$ is constructed at its upper end like a natural shank and has a slightly concave upper contact surface $l$. This contact surface $l$ comprises a slightly raised portion intermediate its length and merging into a cup shaped cavity at its rear end designed to accommodate the rounded portion of the contact surface $k$ of the hollow thigh casing. From this cup-shaped cavity of the contact surface $l$ extends a tapered bore $i$ into the hollow shank casing $b$, the wider, upper end of this bore lying in the contact surface $l$. In order to more clearly show the configuration of the hollow thigh and shank casings the bones $q$ and $t$ of a natural knee joint are shown in dot-dash lines in conjunction with the contact surfaces. In the hollow thigh casing $a$ a transverse pin $e$ is fixed in the centre of the arc formed by the rounded portion of contact surface $l$ and a transverse pin $d$ is fixed in the hollow shank casing $b$ near the front side thereof. On these transverse pins $e$ and $d$ a pair of links $c$ are mounted, one link near the one end of the pins and the other link near the other end of said transverse pins. These links loosely connect the hollow thigh casing with the hollow shank casing. A bolt $f$ loosely mounted on the transverse pin $e$ of the hollow thigh casing extends through the sector shaped recess in the thigh casing and through the tapered bore $i$ in the hollow shank casing $b$ and carries on its lower screw threaded end a rubber pad $g$, or a spiral spring, and a nut $h$ is screwed on the screw threaded end of this bolt and adapted to adjust the position of pad $g$ on the bolt $f$. The contact surfaces $k$ and $l$ are covered each with a layer $m$, $n$ respectively of leather, vulcanized fibre, cork and the like.

The contact surfaces $k$ and $l$ roll the one on the other when the artificial knee joint is bent, the rounded portion at the rear of the contact surface $k$ engaging in the cup-shaped cavity of the contact surface $l$ when the leg is in bent position. A cap $o$ on the front side of the hollow thigh casing $a$ and of the hollow shank casing $b$ holds these casings together, a rubber band $s$ being attached to the top end of this cap. The cap $o$ has on each side edge a flap $p$ which may be pivotally mounted on the upper portion of the hollow shank casing or on the links $c$. Instead of a pair of links $c$ only one link may be provided and mounted at the middle of the transverse pin e.

To make the rolling movement of the hollow casings easier or more difficult, the configuration of the contact surface l of the hollow shank casing b must be altered accordingly. The bearings of the transverse pin d may be made in one piece with the contact surface e of the hollow shank casing.

I claim:—

A knee joint for artificial legs, comprising in combination a hollow thigh casing constructed at its lower end like a natural thigh with a very slightly convex lower surface terminating at its rear end in a rounded portion forming the arc of a circle with its centre near the rear side of the casing and having a sector shaped recess embracing an angle of more than 90° extending from said rounded portion to the centre of the arc, a hollow shank casing constructed at its upper end like a natural shank with a slightly concaved upper surface with a slightly raised portion intermediate its length merging into a cup-shaped cavity at its rear end to accommodate the rounded portion of said thigh casing and having a tapered bore leading from the interior of the shank casing to said cavity and widening towards its outer end, a transverse pin in said thigh casing in the centre of the rounded portion thereof and extending through the upper end of said recess, a transverse pin in said shank casing towards the front side thereof, a pair of links hingedly connecting said transverse pins and consequently inclining upwards towards the rear side of the joint from the shank casing pin to the thigh casing pin, said links adapted to prevent mutual displacement of said casings in horizontal direction, a bolt mounted on the pin in said thigh casing and extending loosely through the recess in said thigh casing to allow the mutual oscillation of said casings, and extending also through the bore in said shank casing, said bolt adapted to shift vertically and swing slightly in said bore during the mutual oscillation of said casings, and adjustable means on said bolt in said shank casing adapted to limit the upward movement of said bolt to limit the forward swinging movement of said thigh casing relative to said shank casing.

GEORG GREISSINGER.